(12) United States Patent
Hagiuda (10) Patent No.: US 7,904,613 B2
(45) Date of Patent: Mar. 8, 2011

(54) NETWORK DEVICE, NETWORK DEVICE MANAGEMENT METHOD, NETWORK DEVICE MANAGEMENT SYSTEM

(75) Inventor: Tadashi Hagiuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 12/194,156

(22) Filed: Aug. 19, 2008

(65) Prior Publication Data

US 2009/0070494 A1    Mar. 12, 2009

(30) Foreign Application Priority Data

Sep. 6, 2007   (JP) .................................. 2007-231882

(51) Int. Cl.
*G06F 3/00* (2006.01)
*G06F 9/00* (2006.01)

(52) U.S. Cl. .............................................. 710/19; 713/1
(58) Field of Classification Search ...................... 710/19
See application file for complete search history.

(56) References Cited

U.S. PATENT DOCUMENTS

| | | | | |
|---|---|---|---|---|
| 5,652,613 A | * | 7/1997 | Lazarus et al. ................... | 725/50 |
| 6,707,563 B1 | * | 3/2004 | Barry et al. ................... | 358/1.14 |
| 7,774,351 B2 | | 8/2010 | Iwatsu et al. | |
| 2005/0165810 A1 | | 7/2005 | Yokoyama ................... | 707/100 |
| 2007/0033007 A1 | | 2/2007 | Narahara et al. | |
| 2007/0100960 A1 | * | 5/2007 | Eichstaedt et al. ............. | 709/217 |
| 2008/0104044 A1 | * | 5/2008 | Kardamilas et al. .............. | 707/4 |

FOREIGN PATENT DOCUMENTS

| | | |
|---|---|---|
| CN | 1649343 A | 8/2005 |
| CN | 1816877 A | 8/2006 |
| CN | 1933586 A | 3/2007 |
| JP | 2001-142361 | 5/2001 |
| JP | 2005-209056 | 8/2005 |
| WO | WO 2006/123806 A1 | 11/2006 |

\* cited by examiner

*Primary Examiner* — Henry W Tsai
*Assistant Examiner* — Juanito C Borromeo
(74) *Attorney, Agent, or Firm* — Fitzpatrick, Cella, Harper & Scinto (57) ABSTRACT

This invention solves the problem of RSS, i.e., the possibility of notification failure while taking its advantage that allows use of existing software such as a browser. For this purpose, an RSS control unit detects failure occurrence via an internal interface, gives a level corresponding to the type of the failure to the failure information, generates an RSS information unit that describes the failure information, and registers the RSS information unit in a database. A client accesses a WWW server of a multi-function device based on an URL registered in advance at a predetermined timing, and displays the contents of an RSS information unit acquired by searching the newly registered RSS information units. If an event of recovery from failure has occurred, the RSS control unit lowers the level corresponding to the RSS information unit of the recovered failure.

8 Claims, 9 Drawing Sheets

| EVENT CLASS | BEFORE LEVEL CHANGE | AFTER LEVEL CHANGE |
|---|---|---|
| SERVICE CALL OCCURRENCE | 10 | 4 |
| SERVICE CALL RECOVERY | 6 | |
| ERROR OCCURRENCE | 9 | 3 |
| ERROR RECOVERY | 5 | |
| WARNING OCCURRENCE | 8 | 2 |
| WARNING RECOVERY | 4 | |
| INFORMATION | 7 | |

FIG. 9

```
<?xml version="1.0" encoding="utf-8" ?>
<RSS version="2.0">  ~901
  <channel>
    <title> DEVICE STATE NOTIFICATION </title>
    <link>http://172.24.153.xx/ </link>
    <description> NOTIFY DEVICE STATE </description>           902
    <language>ja</language>
    <item>
      <title> NO PAPER IN CASSETTE 3 [DEVICE NAME : AAAA, PRODUCT NAME :
          AA, UPDATE DATE AND TIME : 2006/11/24  13:30:15] </title>
      <link>http://172.24.153.xx/xx.html</link>  ~903
      <description> REPLENISH THIRD CASSETTE WITH A4 PAPER
      </description>
    </item>
    <item>
      <title> NO PAPER IN CASSETTE 4 [DEVICE NAME : AAAA, PRODUCT
          NAME : AA, UPDATE DATE AND TIME : 2006/11/24  19:40:15] </title>
      <link>http://172.24.153.xx/yy.html</link>
      <description> REPLENISH FOURTH CASSETTE WITH A4 PAPER
      </description>
    </item>
    <item>
      <title> PAPER IS ADDED TO CASSETTE 3 [DEVICE NAME : AAAA, PRODUCT
          NAME : AA, UPDATE DATE AND TIME : 2006/11/25  08:30:15] </title>
      <link>http://172.24.153.xx/xx.html</link>
      <description> THIRD CASSETTE IS REPLENSIHED WITH A4 PAPER
      </description>
    </item>
  </channel>
</RSS>
```

NETWORK DEVICE, NETWORK DEVICE MANAGEMENT METHOD, NETWORK DEVICE MANAGEMENT SYSTEM

BACKGROUND OF THE INVENTION

1. Field of the Invention

The present invention relates to a network device, network device management method, network device management system, and program which have a function of notifying a terminal apparatus such as a computer of device management information such as failure occurrence information.

2. Description of the Related Art

Conventionally, to manage a network device such as a multi-function device from a computer connected to a network, a network device management program is installed in the computer, thereby implementing management. The management methods are roughly classified into a polling method of causing a computer to poll a device, and a trap method of causing a device to issue a trap to a computer. For example, Japanese Patent Laid-Open No. 2001-142361 discloses a remote centralized management system using the trap method, in which a central control device manages a plurality of image forming apparatuses. Upon receiving failure information from an image forming apparatus, the central control device holds it as display information. The central control device determines the emergency level by analyzing the failure information, and if recovery from failure is necessary, transmits a reset instruction to the image forming apparatus. Recognizing recovery from failure, the central control device registers, in a log memory as log information, the failure information held as display information and erases it from the display memory.

Figure 4:
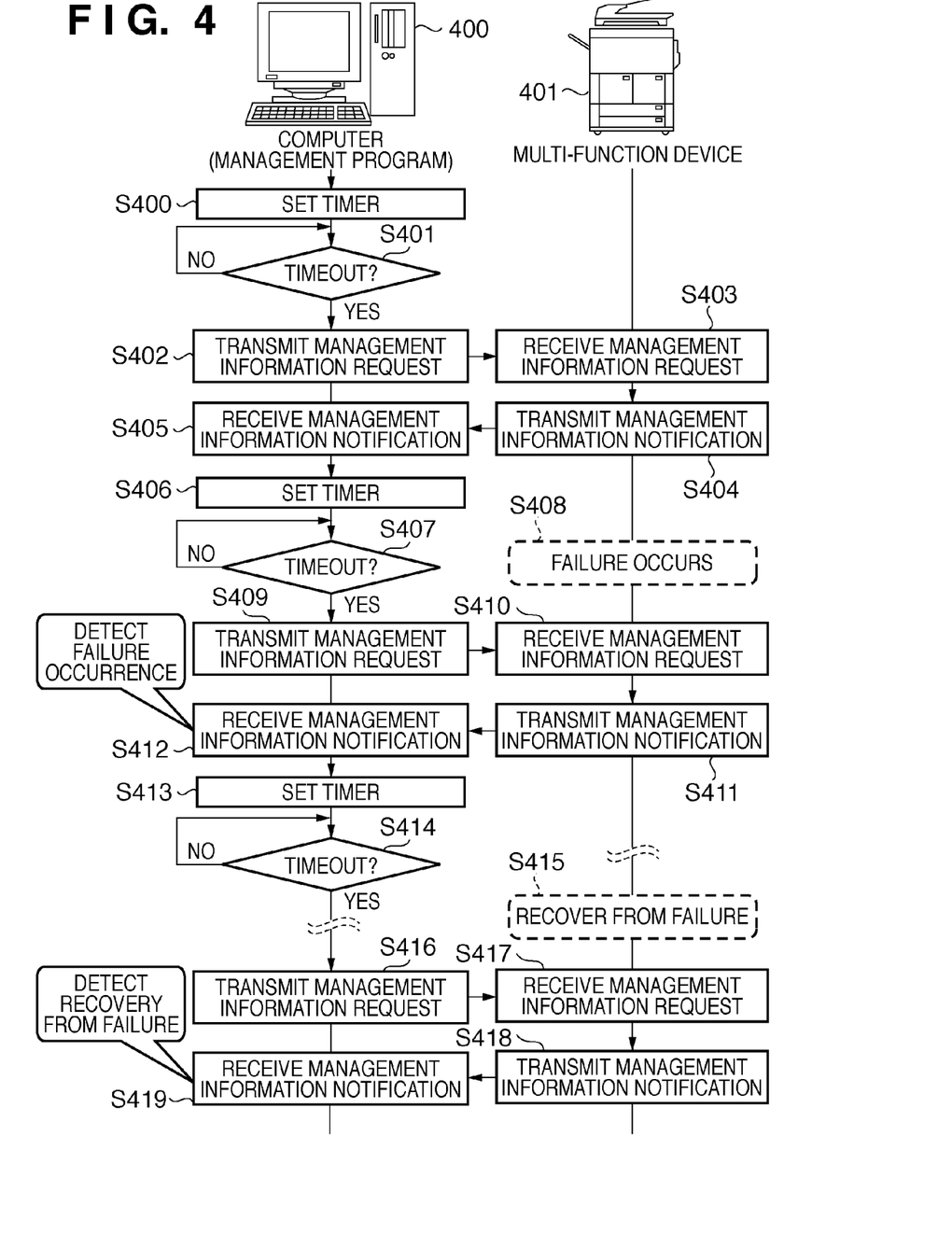
FIG. 4 is a flowchart illustrating an operation of a conventional network device management system which acquires information from a multi-function device by polling.

FIG. 4 is a flowchart illustrating an operation of causing a network device management program running on a computer 400 to acquire, by polling, information from a multi-function device 401 that is a network device connected to a network. In step S400 of FIG. 4, the computer sets a timer at a predetermined polling interval set in advance, and the process advances to step S401. In step S401, time-out of the timer set in step S401 is detected, and the process advances to step S402. In step S402, the network management program running on the computer 400 transmits, to the multi-function device 401, a management information request to request management information notification, and the process advances to step S403. In step S403, the multi-function device 401 receives the management information request transmitted from the computer 400 in step S402, and the process advances to step S404. In step S404, to respond to the management information request received in step S403, the multi-function device 401 transmits, to the computer 400, a management information response including the status information of the multi-function device 401, and the process advances to step S405. In step S405, the computer 400 receives the management information response transmitted from the multi-function device 401 in step S404 and analyzes necessary management information. The computer notifies the user of necessary information obtained by analysis via the network device management program, and the process advances to step S406. From step S406, the operation in steps S400 to S405 is repeated in steps S406, S407, S409, S410, S411, S412, S413, S414, S416, S417, S418, S419.

If a failure such as paper out has occurred in the multi-function device 401 in step S408, the multi-function device 401 notifies the computer 400 of the failure occurrence by management information response transmission in step S411. In step S412, the computer 400 receives the notification and detects the failure occurrence in the multi-function device 401. Similarly, if the multi-function device 401 has recovered from the failure in step S415, the multi-function device 401 notifies the computer 400 of the recovery from the failure by management information response transmission in step S418. In step S419, the computer 400 receives the notification and detects the recovery from the failure of the multi-function device 401.

Figure 5:
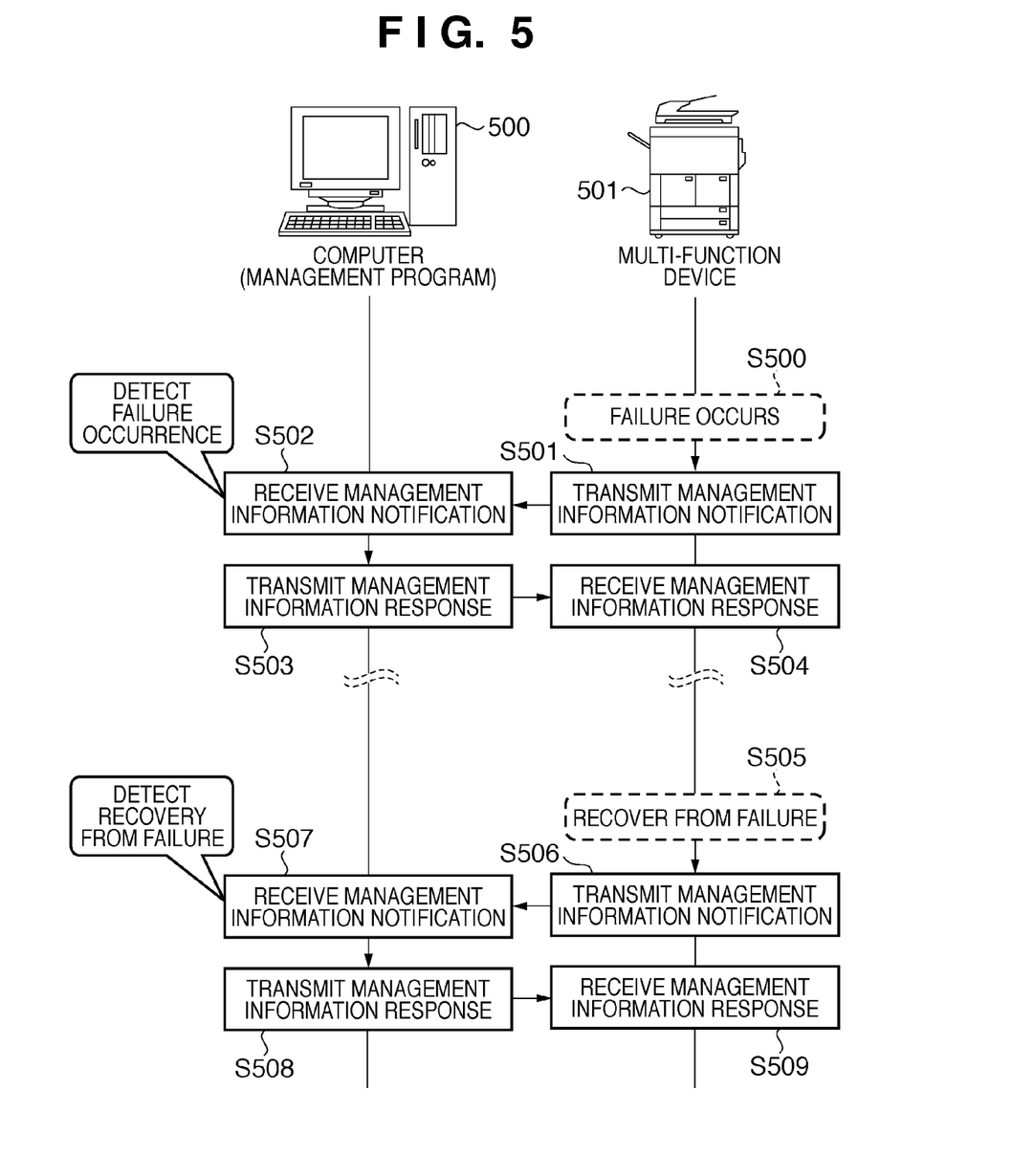
FIG. 5 is a flowchart illustrating an operation of another conventional network device management system which acquires information from a multi-function device by an event.

FIG. 5 is a flowchart illustrating an operation of causing a network device management program running on a computer 500 to acquire, by event notification, information from a multi-function device 501 that is a network device connected to a network. In step S500 of FIG. 5, a failure such as paper out occurs in the multi-function device 501, and the process advances to step S501. In step S501, the multi-function device 501 notifies the computer 500 of the failure occurrence by management information notification. The computer 500 receives the management information notification in step S502, and the process advances to step S503. In step S503, the computer 500 notifies, by failure information notification response, the multi-function device 501 that it has correctly received the management information sent in step S501. The device receives the response in step S504. In steps S505, S506, S507, S508 and S509, the multi-function device 501 notifies the computer 500 of recovery from the failure.

In both cases, information to be handled depends on implementation of the network device management program running on the computer. If the capability of the multi-function device is expanded, the network device management program must be reinstalled.

A notification may be sent to the PC by e-mail, instead of using the network device management program. All the above-described methods are advantageous because the client PC can receive notifications from the device without omission. However, the network device management program requires upgrade to harmonize with a change on the device side. To use e-mail, it is necessary to prepare a mechanism for creating mail and a mail server on the device side.

Against this backdrop, a technique of causing a device to distribute summary information of, for example, a device error or event to a client terminal using RSS (short for RDF Site Summary) as an information management and notification means is also being developed. RSS is a technique of distributing the heads, summaries, and links of articles on Web sites. A Web site generates RSS information (also referred to as syndication data) based on the heads, summaries, and links of articles updated on Web pages. The RSS information is a source described in an RSS format based on XML. The RSS format has several versions such as RSS0.91, RSS2.0, RSS1.0, and Atom. Any version is usable if the client supports it. The client executes an application program called an RSS reader, and if there is information (called update information) newly generated on a selected Web site, receives it. That is, the RSS reader acquires the update information of a selected Web site and displays it on the screen by periodically downloading generated RSS information. If the Web page has links, the user can jump to the Web page of each article. Using the RSS, it looks for the user as if the update information were distributed from the selected Web site. This allows the user to efficiently browse interesting pages in an enormous number of HTML pages.

A method of notifying a user of the status information of a plurality of printers using the RSS technique is proposed in, for example, Japanese Patent Laid-Open No. 2005-209056. Japanese Patent Laid-Open No. 2005-209056 proposes a printer having a function of providing the device state as data in an RSS format. The printer generates an HTML page representing the device state, and then generates, based on the HTML page, RSS information containing the heads and summaries of pages, and links to HTML pages of the source. A user who wants to receive notifications registers the URL of the collection target site in the RSS reader on the client PC. This enables the user to easily grasp the contents of printer state changes using a Web browser program. The use of the RSS allows the client to monitor occurrence of an event such as failure using a general-purpose browser incorporating an RSS reader. This obviates new development or upgrade of software in a client and enables a client to very flexibly cope with a change on the network device side. Even when an event such as failure to notify changes due to, for example, change of the model or update of software, it is unnecessary to change the Web browser or RSS reader in the client. It brings about significant advantages because a network device is generally shared by a number of clients. The device need only have an HTML server program in it to distribute HTML pages, and also a mechanism for generating the HTML pages and RSS information. Additionally, notification contents are described in an RSS format, that is, a general-purpose format based on XML and are therefore restricted by only implementation upon RSS information generation.

However, RSS restricts information to notify by a number or time limit. Pieces of update information beyond a predetermined number or time limit are generally deleted. Hence, if the number of update information exceeds the upper limit, or some pieces of update information have expired, information to notify the user to failure occurrence may be deleted independently of the current state of the multi-function device. Even when a failure that requires intervention of an operator or the like has occurred, the operator may be unaware of it. For this reason, RSS is inappropriate as a failure occurrence notification means.

SUMMARY OF THE INVENTION

The present invention has been made in consideration of the prior art, and has as its object to solve the above-described problem. More specifically, it is an object of the present invention to provide a network device which solves the problem of RSS by delaying erase of important information such as failure information acquired from the network device as much as possible to raise the reliably of important information transmission while taking advantage of the RSS. Another object of the present invention is to provide, in addition to the network device, a network device management method, network device management system, and program which raise the reliably of information transmission.

According to an aspect of the present invention, a network device comprises:

an information storage configured to store information;

a determination unit configured to determine, when a new RSS information unit is generated in accordance with occurrence of an event, whether an amount of RSS information units stored in the information storage has exceeded a capacity of the information storage;

a deletion unit configured to, when the determination unit determines that the amount of the RSS information units has exceeded the capacity of the information storage, delete the RSS information units stored in the information storage in ascending order of levels corresponding to the RSS information units, thereby securing a free area for the newly generated RSS information unit; and a generator configured to generate, in accordance with occurrence of an event, a new RSS information unit indicating the occurrence of the event and storing the RSS information unit in the information storage together with a level corresponding to the event.

The present invention ensures an effect of solving the problem of RSS by raising the reliably of important information transmission while taking advantage of the RSS such as high versatility of a client or high independence between client-side software and device-side software.

Further features of the present invention will become apparent from the following description of exemplary embodiments with reference to the attached drawings.

DESCRIPTION OF THE EMBODIMENTS

System Configuration (Hardware)

Figure 1:
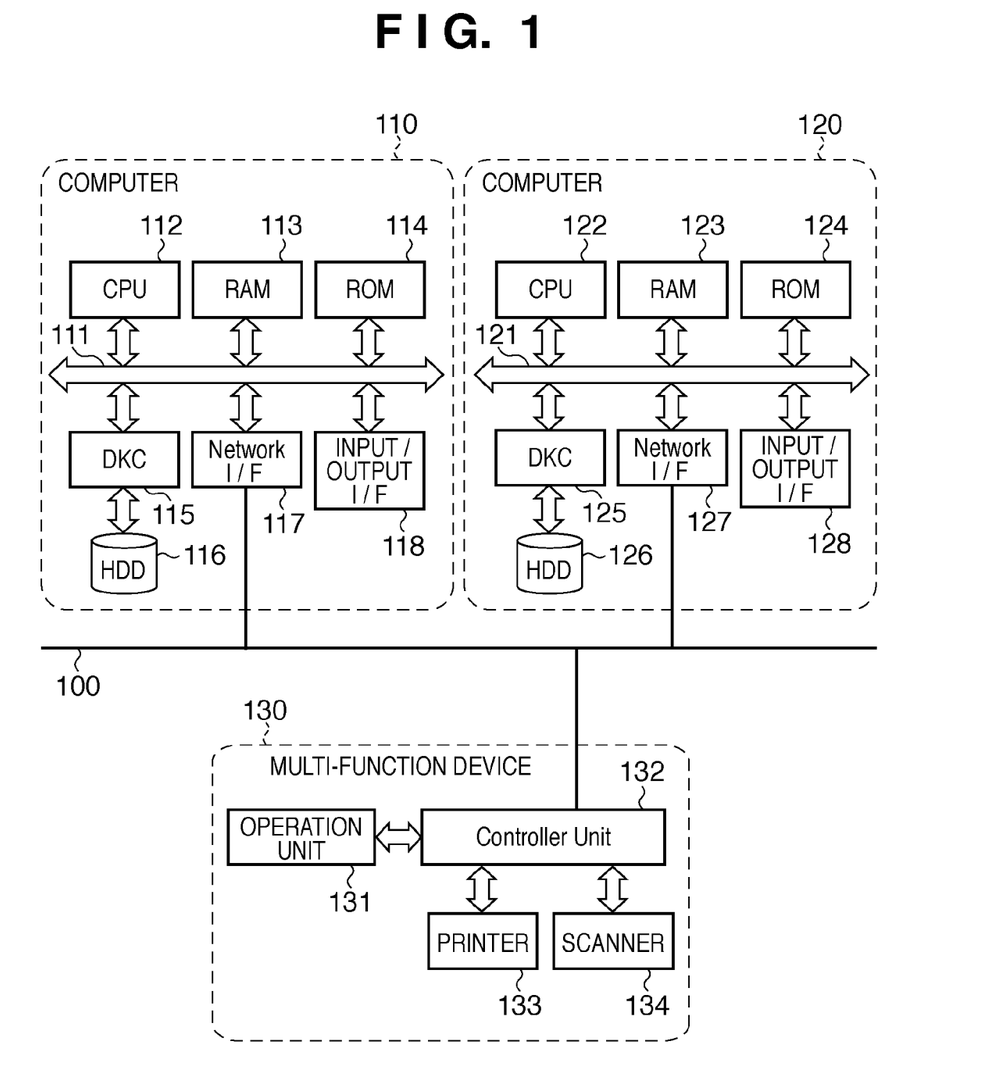
FIG. 1 is a block diagram showing the hardware configuration of a network device management system according to the present invention.

The best mode for carrying out the present invention will now be described with reference to the accompanying drawings. FIG. 1 is a block diagram showing the overall arrangement of a network device management system according to an embodiment of the present invention. Referring to FIG. 1, the network device management system includes a plurality of client computers 110 and 120 connected to each other via a network 100, and a multi-function device 130 having a management information notification function. The network 100 can be built as a TCP/IP network and need only be able to use an HTTP protocol to send management information by RSS.

The plurality of client computers 110 and 120 have the same general-purpose computer arrangement. Hence, only the client computer 110 will be described here, and the hardware configuration of the client computer 120 will be omitted.

In the client computer 110, a system bus 111 connects the elements of the computer. A CPU (Central Processing Unit) 112 executes overall control of the computer and arithmetic processes. A RAM (Random Access Memory) 113 is an area where programs and data are loaded and executed for various processes. A ROM (Read Only Memory) 114 is an area to store a system activation program and the like. A DKC (external storage device control unit) 115 controls an external storage device such as an HDD (Hard Disk Device) 116. The external storage device such as the HDD 116 stores programs and data. The programs and data are referred to or loaded to the RAM 113 as needed at the time of execution. This system operates while the CPU 112 is executing the basic I/O program and operating system (OS). The basic I/O program is written in the ROM 114. The OS is written in the HDD. When the computer unit is powered on, the OS is loaded from the HDD 116 to the RAM 113 by the initial program loading function in the basic I/O program and starts operating. A communication interface 117 is connected to the network to execute network communication. An input/output interface 118 is connected to a keyboard and display to input/output data.

The client computer 120 consists of components 121 to 128 that are the same components comprised in the client 110.

The multi-function device 130 includes an operation unit 131 serving as a user interface, a controller unit 132, a printer 133 serving as an image output device, and a scanner 134 serving as an image input device. The operation unit 131, printer 133, and scanner 134 are connected to the controller unit 132 and controlled. The controller unit 132 is connected to the network 100 to communicate with the client computer 110 or 120. The multi-function device 130 need not always include the scanner 134. The controller unit 132 executes an HTTP server (WWW server), generates RSS information (syndication data), and saves it in a file storage such as a hard disk.

<Hardware Configuration of Multi-Function Device>

Figure 2:
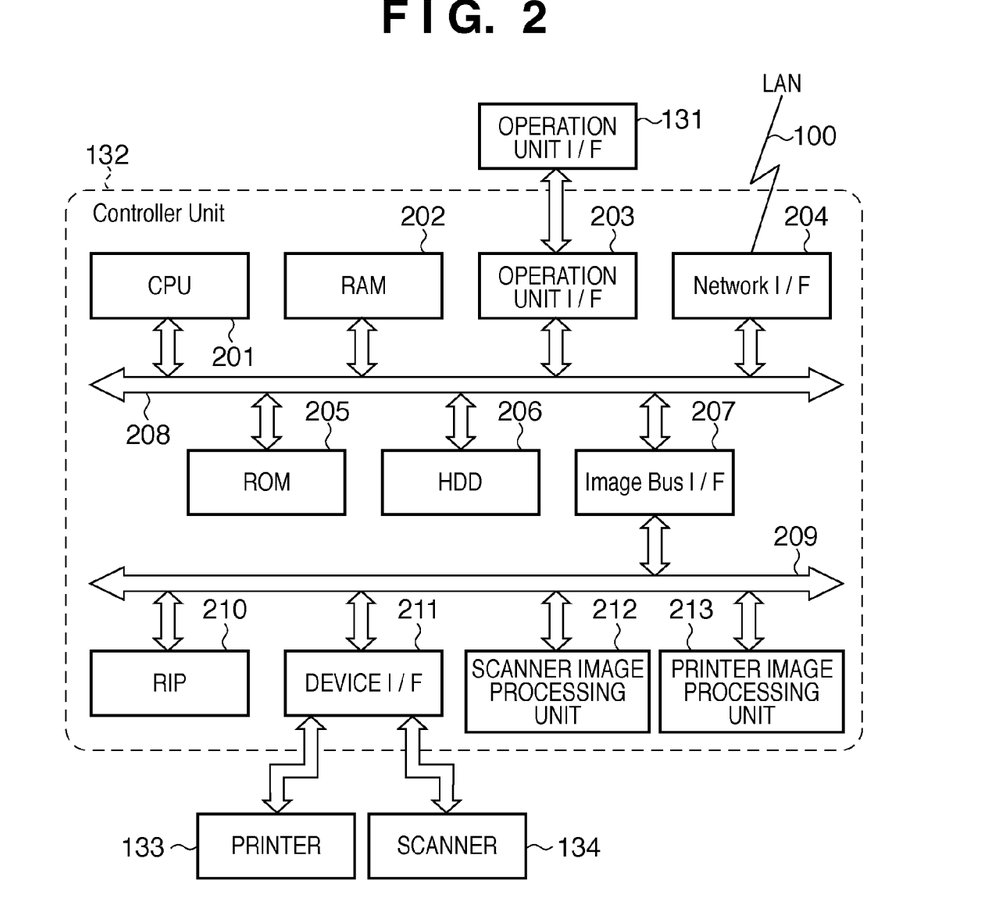
FIG. 2 is a block diagram showing the arrangement of the controller unit of a multi-function device according to the present invention.

FIG. 2 is a block diagram showing the arrangement of the controller unit 132 of the multi-function device 130. A CPU 201 is a controller to control the overall controller unit 132. A RAM 202 is a system work memory to be used by the CPU 201 for the operation. The RAM 202 also serves as an image memory for temporarily storing image data. A ROM 205 is a boot ROM which stores a system boot program. An HDD 206 is a hard disk drive which stores system software and image data. An operation unit I/F 203 interfaces with the operation unit 131 to output, to the operation unit 131, image data to be displayed on it. The operation unit I/F 203 also transmits, to the CPU 201, information input by the user via the operation unit 131. A network interface 204 is connected to the network 100 to control information input/output to/from it. An image bus interface 207 is a bus bridge that connects a system bus 208 to an image bus 209 for transferring image data at high speed to convert the data structure. The image bus 209 is formed from a PCI bus or IEEE1394. A raster image processor (RIP) 210 rasterize a PDL command transmitted from the network into a bitmap image. A device I/F unit 211 connects the printer 133 and scanner 134 serving as image output and input devices to the controller unit 132 to perform conversion between synchronous and asynchronous systems. A scanner image processing unit 212 corrects, manipulates, and edits input image data. A printer image processing unit 213 executes correction and resolution conversion corresponding to the performance of the printer 133 for print output image data. Of the above-described components, the scanner 134 and scanner image processing unit may be omitted.

<System Configuration (Software)>

Figure 3:
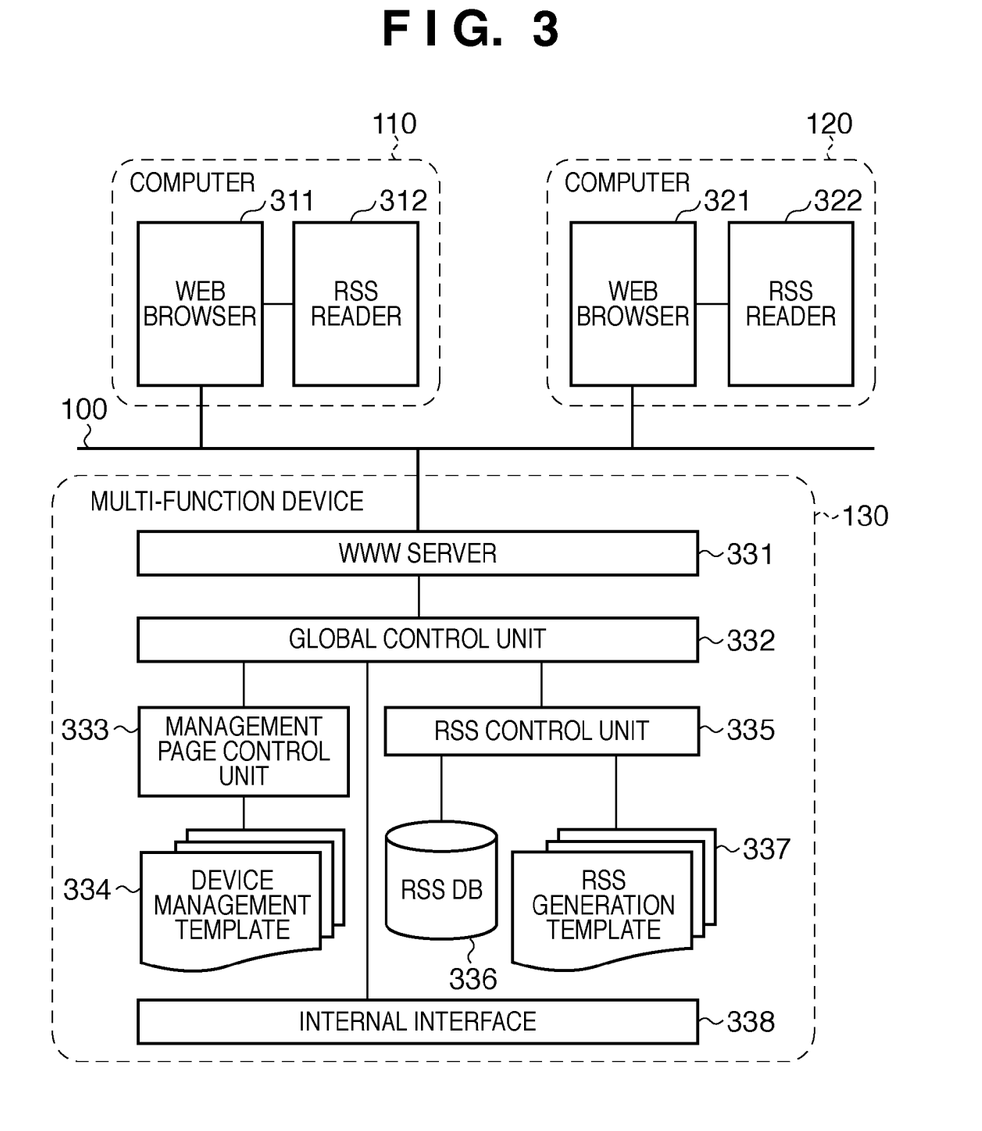
FIG. 3 is a block diagram showing the software configuration of the network device management system according to the present invention.

FIG. 3 shows the software configuration of the network device management system according to the embodiment of the present invention. Software running on the client computer 110 or 120 is stored in the hard disk (HDD) 116, and its execution entity is the CPU 112, unless it is specifically stated otherwise. On the other hand, software running on the multi-function device 130 is stored in the hard disk (HDD) 206, and its execution entity is the CPU 201.

As in FIG. 1, the client computers 110 and 120 are general-purpose computers having the same arrangement and same software configuration. WEB browsers 311 and 321 run on the client computers 110 and 120 and access an arbitrary WEB site using the HTTP protocol. RSS readers 312 and 322 are applications that periodically acquire update information of an arbitrary WEB site and notify the user of it. A WWW server 331 runs on the multi-function device. The multi-function device 130 of this embodiment generates HTML data including management information such as a device state and option attachment state and presents the information to the user via the WWW server 331.

A global control unit 332 controls a management page control unit 333, RSS control unit 335, and internal interface 338 to generate HTML data including the management information of the multi-function device 130. The global control unit 332 is a functional module for generating HTML data and an RSS information unit. An RSS information unit is a group of information about update at a time. The group will be referred to as an RSS information unit. In this embodiment, the RSS information unit is sometimes simply referred to as RSS information. The management page control unit 333 is a functional module for acquiring the information of a multi-function device state or option attachment state from the internal interface 338 via the global control unit 332 and generating HTML data by referring to a device management template 334. The RSS control unit 335 acquires, for example, failure occurrence information from the internal interface 338 via the global control unit 332 and stores RSS information in an RSS database 336 by referring to an RSS generation template 337. That is, the RSS database 336 corresponds to information storage means for storing information. In this embodiment, the number of RSS information units to store is set in advance, and information to store is managed by a control method to be described later. The internal interface 338 is a software module for detecting a failure that has occurred in the multi-function device 130, or any other event information.

<Operation of Management Information Notification Function on Multi-Function Device>

Figure 6:
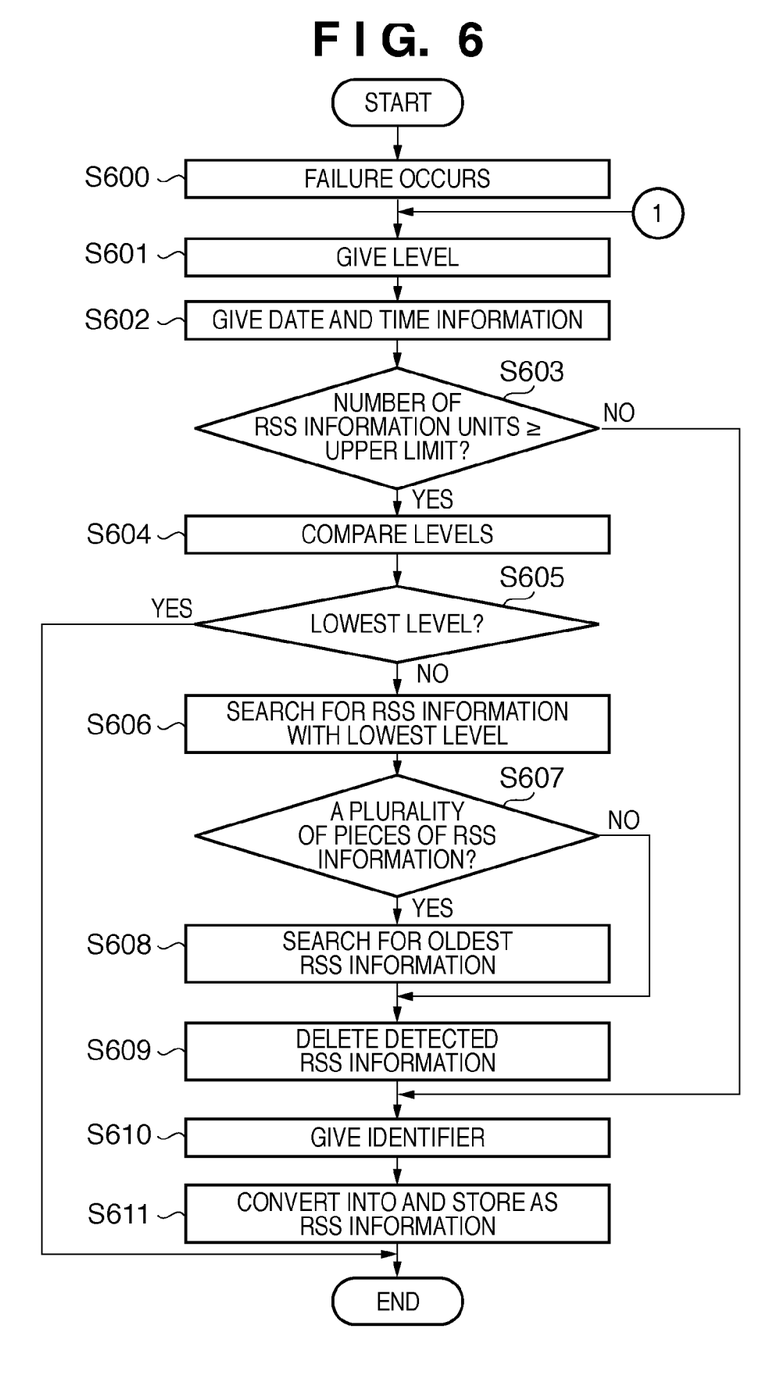
FIG. 6 is a flowchart illustrating an operation of the management information notification function of the multi-function device according to the present invention at the time of failure occurrence.

FIG. 6 is a flowchart illustrating an operation of the management information notification function implemented in the multi-function device 130 included in the network device management system of the embodiment at the time of failure occurrence. The CPU 201 executes the procedure shown in FIG. 6. However, the following description will be made assuming that the software module in FIG. 3 which is implemented by the CPU 201 is the execution entity.

In step S600 of FIG. 6, the global control unit 332 detects information about occurrence of an event such as a failure (to be referred to as failure occurrence information hereinafter) via the internal interface 338, and the process advances to step S601. Note that detection of event occurrence may trigger the procedure in FIG. 6. The following explanation will be made using failure occurrence as an example of an event. In step S601, the failure occurrence information detected in step S600 is given a level corresponding to its class (or type), and the process advances to step S602. If the event that has occurred is a failure, the level is preferably higher than that of any event other than the failure. The level of the failure given in step S601 will be described later in detail with reference to FIG. 8. In step S602, the failure occurrence information with the level given in step S601 is given date and time information, and the process advances to step S603. In step S603, it is determined by referring to the RSS database 336 whether the number of stored RSS information units (i.e., information amount) is larger than a preset upper limit. More specifically, it is determined whether the amount of the stored RSS information units has exceeded the capacity of the information storage means. If YES in step S603, the process advances to step S604. Otherwise, the process advances to step S610.

In step S604, the level given to the failure occurrence information in step S601 is compared with the level of each RSS information unit stored in the RSS database 336, that is, the level corresponding to each RSS information unit, and the process advances to step S605. In step S605, it is determined whether the level given to the failure occurrence information is lowest as a result of comparison in step S604. If the level given to the failure occurrence information is not lowest, the process advances to step S606. Otherwise, the process is ended. That the level is lowest indicates that the level is lower than all the levels corresponding to the stored RSS information units.

Upon determining in step S605 that the level given to the failure occurrence information is not lowest, an RSS information unit having the lowest level is searched for in the saved RSS information units in step S606. Then, the process advances to step S607. The RSS information unit found by this search is a deletion candidate. In step S607, it is determined whether a plurality of RSS information units having the lowest level are detected in step S606. If YES in step S607, the process advances to step S608. Otherwise, the process advances to step S609.

Upon determining in step S607 that a plurality of RSS information units having the lowest level are detected, the oldest one of the RSS information units is detected by referring to the date and time information given to each RSS information unit in step S608. Then, the process advances to step S609. The RSS information unit detected at this time is a deletion candidate. In step S609, the oldest RSS information unit having the lowest level, which is detected in step S608, is deleted, and the process advances to step S610.

In step S610, a unique identifier corresponding to the class of the failure is associated with or given to the failure occurrence information to manage the failure occurrence information detected in step S600 and information to notify recovery from failure in pairs. Then, the process advances to step S611. In step S611, the failure occurrence information detected in step S600 is converted into an RSS information unit by referring to the RSS generation template 337 and is stored in the RSS database 336. Hence, the stored RSS information unit has the level and identifier corresponding to the class of the failure occurrence information.

As described above, when a failure has occurred, a level corresponding to its class is given to the failure occurrence information. If the RSS database has a sufficient free area, an RSS information unit corresponding to the failure occurrence information including the level and identifier is generated and stored. On the other hand, if the RSS database has no sufficient free area, it is determined first whether the priority, that is, the level of the failure occurrence information is lower than those of other events that have currently occurred. If the level is lower than any event that has already occurred and registered in the RSS database as an RSS information unit, the failure occurrence information is not registered in the RSS database. If an event that has already occurred and been registered in the RSS database as an RSS information unit has a level equal to or lower than the failure that has newly occurred, the RSS information unit is deleted to secure a free area in the RSS database. If the priority cannot be determined only by the level, RSS information units having recent date and time information are given higher priority, and the oldest RSS information unit is deleted. In this way, only failure occurrence information having a level higher than the existing RSS information units is converted into an RSS information unit and stored in the RSS database 336.

In this example, only the RSS information unit is generated. However, the management page control unit 333 may create a page described in the HTML, make it open on the WWW server, and generate an RSS information unit based on the newly created page. This is because RSS information is summary information that should originally be created based on HTML contents. In this case, the created page can include details and image data that cannot be described in the RSS information unit. When a link to the source page is described in the RSS information unit, the client that browses the RSS information unit can easily access the source page. Additionally, for the failure information determined to have the lowest level in step S605 of FIG. 6, not an RSS information unit but an HTML page that describes details of the failure is created. This makes it possible to newly create the RSS information unit based on the HTML page and register it in the RSS database when a free area is secured in it.

<Device Operation in Recovery from Failure>

Figure 7:
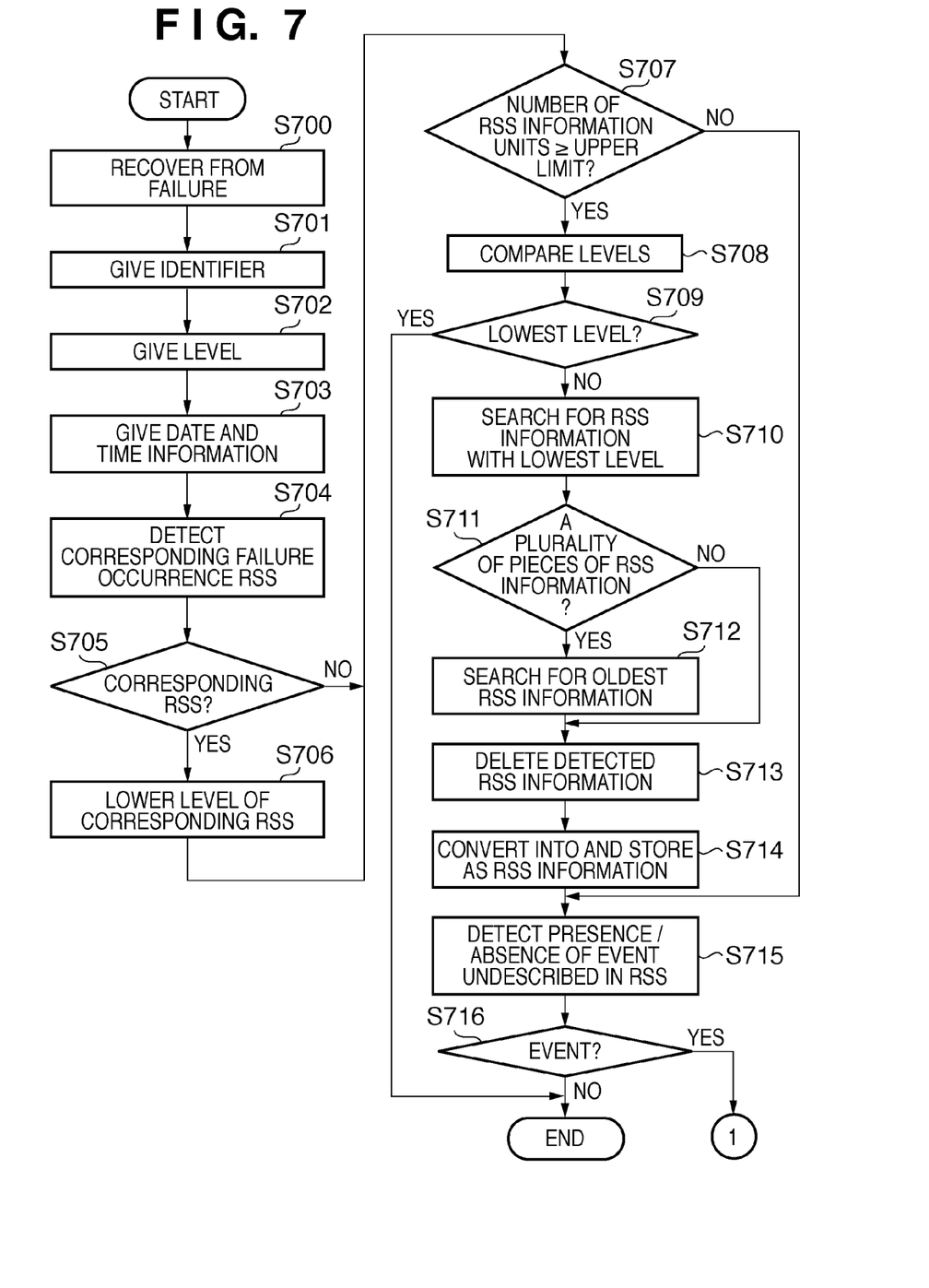
FIG. 7 is a flowchart illustrating an operation of the management information notification function of the multi-function device according to the present invention at the time of recovery from failure.

FIG. 7 is a flowchart illustrating an operation of the management information notification function of implemented in the multi-function device 130 included in the network device management system according to the embodiment of the present invention at the time of recovery from failure. In step S700 of FIG. 7, the global control unit 332 detects information about recovery from failure (to be referred to as recovery-from-failure information hereinafter) via the internal interface 338, and the process advances to step S701. In step S701, the recovery-from-failure information is given an identifier which identifies RSS information to notify the user of occurrence of the failure from which the device has recovered, and the process advances to step S702. The recovery-from-failure information is given the same identifier as that given to the corresponding failure information in step S610 of FIG. 6.

In step S702, the recovery-from-failure information detected in step S700 is given a level corresponding to its class, and the process advances to step S703. In step S703, the recovery-from-failure information with the level given in step S702 is given date and time information of recovery from the failure, and the process advances to step S704. In step S704, the presence/absence of RSS to notify the user of failure occurrence corresponding to the recovery-from-failure information detected in step S700 is detected based on the identifier given in step S701 by referring to the RSS database 336. Then, the process advances to step S705. In step S705, it is determined whether RSS information about the corresponding failure occurrence exists as a result of information detection in step S704. If corresponding RSS information exists, the process advances to step S706. Otherwise, the process advances to step S707. In step S706, the level given to the detected RSS information is changed to a lower one, and the process advances to step S707. The level to be changed is, e.g., the level given to the recovery-from-failure information.

In step S707, it is determined by referring to the RSS database 336 whether the number of stored RSS information is larger than a preset upper limit. If YES in step S707, the process advances to step S708. Otherwise, the process advances to step S715. Upon determining in step S707 that the number of stored RSS information is larger than the set upper limit, the level of each stored RSS information is compared with the level given to the recovery-from-failure information in step S708, and the process advances to step S709. In step S709, it is determined whether the level of the recovery-from-failure information is lowest as a result of level comparison between the RSS information and the recovery-from-failure information in step S708. If the level is not lowest, the process advances to step S710. Otherwise, the process is ended. Upon determining in step S709 that the level of the recovery-from-failure information is not lowest, RSS information having the lowest level is searched for in the saved RSS information in step S710. Then, the process advances to step S711. In step S711, it is determined whether a plurality of pieces of RSS information having the lowest level are detected for the stored RSS information unit in step S710. If YES in step S711, the process advances to step S712. Otherwise, the process advances to step S713.

Upon determining in step S711 that a plurality of pieces of RSS information having the lowest level are detected from the RSS database, the oldest one of the pieces of RSS information is detected by referring to the date and time information given to each RSS information in step S712. The process advances to step S713. In step S713, the oldest detected RSS information having the lowest level is deleted, and the process advances to step S714. In step S714, the recovery-from-failure information detected in step S700 is converted into RSS information by referring to the RSS generation template 337 and stored in the RSS database 336. Then, the process advances to step S715.

In step S715, an event of the multi-function device 130, which is not yet registered as RSS information but has become a registration target when the level given to existing RSS information is lowered in step S706, is detected. The process advances to step S716. Assume that certain failure information is registered in the RSS database because it had the lowest level at the time of failure occurrence. If the failure at that time is solved, and the level of the failure information corresponding to an RSS information unit is lowered to a level lower than that of the unregistered failure information, a free area can be secured in the RSS database by deleting the RSS information unit. The process from step S716 is executed in such a case, step S715 is an example of a second determination means for determining whether a failure has occurred in a device, and no RSS information unit corresponding to the failure has been stored when the level of a stored RSS information unit is changed.

Upon determining in step S716 that an event that is not registered as RSS information is detected in step S715, the process advances to step S601 in FIG. 6. Otherwise, the process is ended. More specifically, if a failure has occurred in a device, and no RSS information unit corresponding to the failure has been stored as a result of determination in step S716, the RSS information unit that should have been generated at the time of the event of the failure occurrence information is generated and registered in the database.

The process in steps S707 to S713 is common to that in steps S603 to S609 in FIG. 6, although the information contents are different.

As described above, in recovery from a failure, the level of the RSS information is lowered to notify the user of occurrence of corresponding failure. It is therefore possible to efficiently store only information with a high emergency level in the RSS database 336.

<Example of Levels Corresponding to RSS Failure Information>

Figure 8:
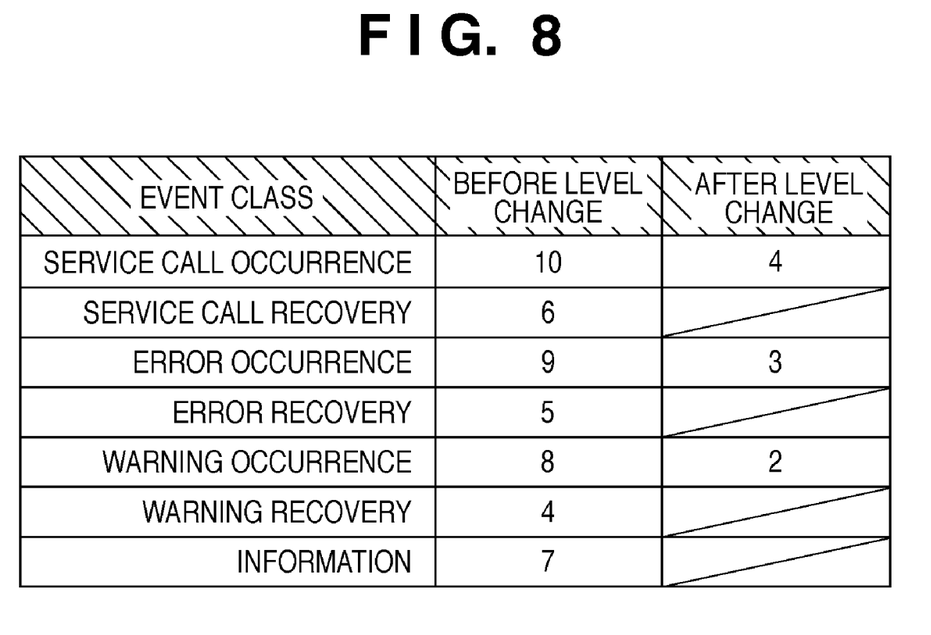
FIG. 8 is a view showing an example of levels to be assigned to events by the management information notification function of the multi-function device according to the present invention.

FIG. 8 is a view showing an example of levels to be assigned to various kinds of events that occur in the multi-function device 130 according to this embodiment. The events of the multi-function device 130 are roughly classified into four events: "service call", "error", "warning", and "information". "Service call" indicates a failure which requires maintenance by a serviceman for the multi-function device for recovery. "Error" indicates a failure such as cover open that impedes normal use of the multi-function device. "Warning" indicates an event such as low toner level or paper out which is expected to impede the operation of the multi-function device 130. "Information" indicates an event such as a power saving mode that does not impede the operation of the multi-function device 130. "Failure" in the description of FIG. 6 or 7 corresponds to, e.g., "service call", "error", and "warning".

"Service call", "error", "warning", and "information" are significant in this order. In the present invention, of these states, each of "service call", "error", and "warning" have "occurrence" and "recovery" events. For "service call occurrence", "error occurrence", and "warning occurrence", the level is changed at the time of recovery from a corresponding failure. For, e.g., "service call occurrence", when a service call has occurred, level "10" is given in step S601. At the time of recovery from the corresponding service call, the level is lowered to "4" in step S706. As a result, if a failure, e.g., "service call" is solved, its priority becomes low. Assume that "warning" that has occurred has no corresponding RSS information unit. Even in this case, when the priority is changed, "warning" can be registered because it obtains level "8" that is higher than level "6" of "service call recovery".

As described above, the level to be given to an event (failure) that occurs in the multi-function device 130 changes depending on the other events (recovery).

<Example of RSS Information Unit>

Figure 9:
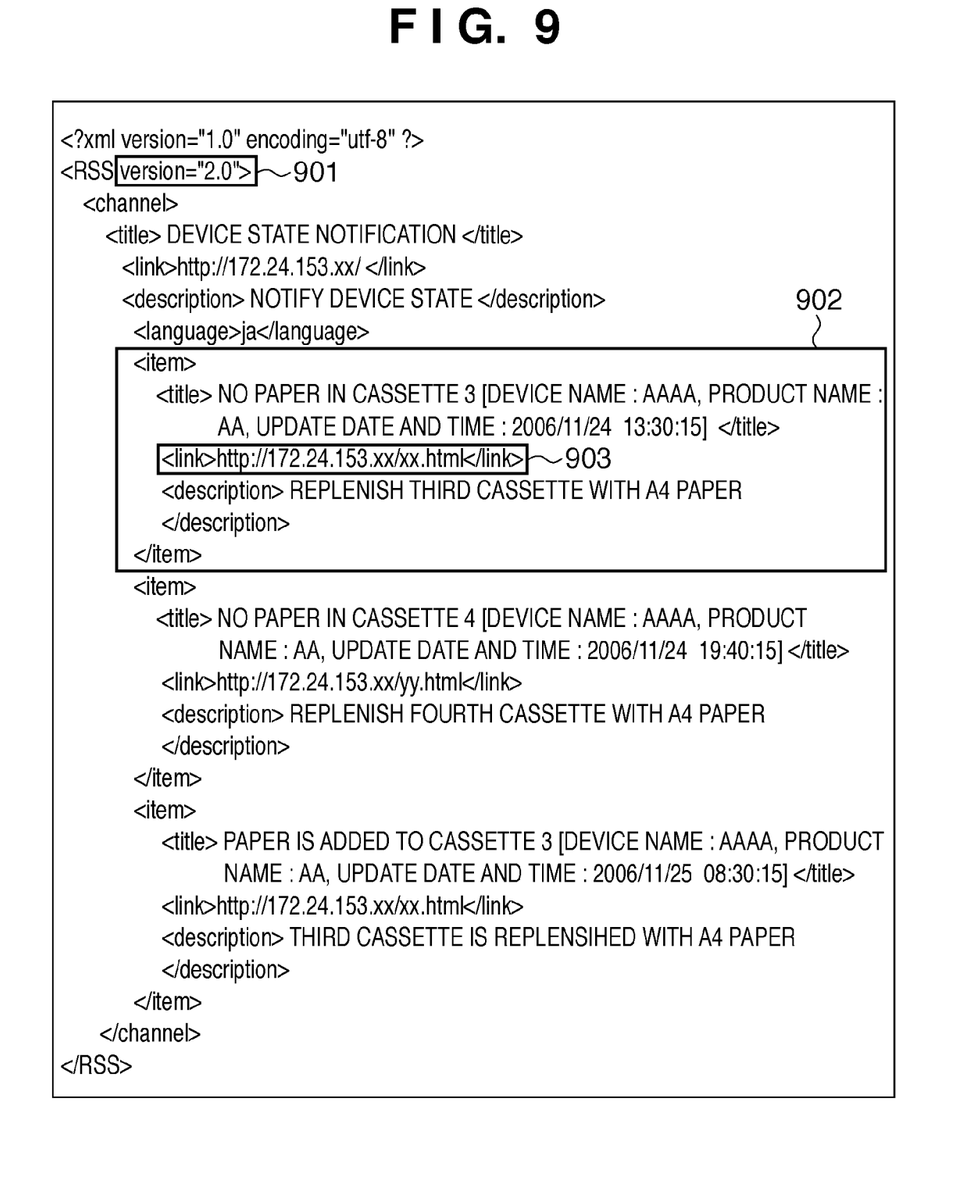
FIG. 9 is a view showing an example of an RSS feed generated by the management information notification function of the multi-function device according to the present invention.

FIG. 9 shows an example of an RSS information unit generated by the management information notification function of the multi-function device 130 and held in the RSS database 336. The RSS information unit is also called an RSS feed and is stored in the RSS database 336. The RSS control unit 335 converts failure occurrence information or recovery-from-failure information by referring to the RSS generation template 337, thereby generating an RSS information unit.

Referring to FIG. 9, an RSS version 901 defines the version of RSS. In this embodiment, the RSS version is described as 2.0. The RSS reader 312 of the client computer 120 needs to support this RSS version. Summary information 902 is associated with each event that has occurred on the multi-function device 130 and converted into RSS information and includes the head of the item, URL, and explanation. A URL 903 indicates detailed information of the summary information 902. Note that the link destination of the URL is a management page that is generated by the management page control unit 333 via the global control unit of the multi-function device 130 by referring to a management page template.

<Client Operation by RSS Reader>

The client operation is the operation of an RSS reader that is generally used. This will briefly be described below. The URL of a site from which the user wants to acquire update information is registered in the RSS reader in advance. For example, a URL such as "http://device.printer1.jp/ . . . /index.rdf" or "http://device.printer1.jp/ . . . /rss.xml" is registered. The RSS reader acquires new update information (i.e., RSS information unit) from the registered site at a designated period or at the start of execution of the RSS reader. The new update information corresponds to an RSS information unit which is additionally registered after the final acquisition. The RSS reader acquires the new RSS information unit and displays its contents and, more particularly, the contents of summary information on the terminal screen. If the link to the source page, which can be contained in the summary information, is designated, the WWW browser is activated so that the HTML page at the link is acquired and displayed. This is the process procedure of a general WWW browser.

Other Embodiments

The present invention is also applicable to a system including a plurality of devices (e.g., host computer, interface device, reader, and printer) or an apparatus (e.g., copying machine or facsimile apparatus) including a single device. The object of the present invention is achieved even by supplying a recording medium which records program codes for implementing the functions of the above-described embodiments to the system or apparatus and causing the computer of the system or apparatus to read out and execute the program codes stored in the storage medium. In this case, the program codes read out from the storage medium implement the functions of the above-described embodiments by themselves, and the program codes themselves and the storage medium which stores the program codes constitute the present invention.

The functions of the above-described embodiments are also implemented when the operating system (OS) running on the computer partially or wholly executes actual processing on the basis of the instructions of the program codes. The present invention is also applicable to a case in which the program codes read out from the storage medium are written in the memory of a function expansion card inserted into the computer or a function expansion unit connected to the computer. In this case, the CPU of the function expansion card or function expansion unit partially or wholly executes actual processing on the basis of the instructions of the written program codes so that the functions of the above-described embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-231882, filed Sep. 6, 2007, which is hereby incorporated by reference herein in its entirety.

What is claimed is:

1. A network device comprising:
    an information storage configured to store information;
    a determination unit configured to determine, when a new RDF Site Summary (RSS) information unit is generated in accordance with occurrence of an event, whether an amount of RSS information units stored in said information storage has exceeded a capacity of said information storage;
    a deletion unit configured to, when said determination unit determines that the amount of the RSS information units has exceeded the capacity of said information storage, delete the RSS information units stored in said information storage in ascending order of levels corresponding to the RSS information units, thereby securing a free area for the newly generated RSS information unit; and
    a generator configured to generate, in accordance with occurrence of an event, a new RSS information unit indicating the occurrence of the event and storing the RSS information unit in said information storage together with a level corresponding to the event,
    wherein said generator comprises a controller for performing control to, if the event that has occurred is a failure event, associate a unique identifier corresponding to a type of the failure with the generated RSS information unit and assign a level higher than those of events other than the failure event to the generated RSS information unit, and if the event that has occurred is a recovery event from a failure, search the stored RSS information units for an RSS information unit with which an identifier corresponding to the solved failure is associated and lower a level given to the RSS information unit.

2. The device according to claim 1, wherein said generator gives date and time information of generation to the RSS information unit and stores the RSS information unit, and
    wherein if a plurality of RSS information units having a lowest level exist as deletion targets, said deletion unit deletes an RSS information unit with oldest date and time information given from the stored RSS information units.

3. The device according to claim 1, further comprising a second determination unit configured to determine, when the level of a stored RSS information unit is changed, whether a failure has occurred in the device, and no RSS information unit corresponding to the failure has been stored,
    wherein if said second determination unit determines that a failure has occurred in the device, and no RSS information unit corresponding to the failure has been stored, said generator generates an RSS information unit which should have been generated at a time of occurrence of an event of the failure occurrence.

4. A network device management method comprising:
    a storing step of storing a RSS information unit in an information storage;
    a deleting step of deleting RSS information units stored in the information storage in ascending order of levels corresponding to the RSS information units, thereby securing a free area for a newly generated RSS information unit; and
    a generating step of generating, in accordance with occurrence of an event, a new RSS information unit indicating the occurrence of the event and storing the RSS information unit in the information storage together with a level corresponding to the event,
    wherein the generating step includes a controlling step of controlling to, if the event that has occurred is a failure event, associate a unique identifier corresponding to a type of the failure with the generated RSS information unit and assign a level higher than those of events other than the failure event to the generated RSS information unit, and if the event that has occurred is a recovery event from a failure, search the stored RSS information units for an RSS information unit with which an identifier corresponding to the solved failure is associated and lower a level given to the RSS information unit.

5. A network device management system comprising:
    (1) a network device including:
        (a) an information storage configured to store information;
        (b) a determination unit configured to determine, when a new RSS information unit is generated in accordance with occurrence of an event, whether an amount of RSS information units stored in the information storage has exceeded a capacity of the information storage;

(c) a deletion unit configured to, when the determination unit determines that the amount of the RSS information units has exceeded the capacity of the information storage, delete the RSS information units stored in the information storage in ascending order of levels corresponding to the RSS information units, thereby securing a free area for the newly generated RSS information unit; and (d) a generator configured to generate, in accordance with occurrence of an event, a new RSS information unit indicating the occurrence of the event and storing the RSS information unit in the information storage together with a level corresponding to the event, and (2) a terminal device which acquires the RSS information unit newly generated by the generator and displays occurrence of the event corresponding to the acquired RSS information unit, wherein said generator comprises a controller for performing control to, if the event that has occurred is a failure event, associate a unique identifier corresponding to a type of the failure with the generated RSS information unit and assign a level higher than those of events other than the failure event to the generated RSS information unit, and if the event that has occurred is a recovery event from a failure, search the stored RSS information units for an RSS information unit with which an identifier corresponding to the solved failure is associated and lower a level given to the RSS information unit.

6. A non-transitory computer-readable storage medium storing a program for causing a computer to perform a network device management method, said method comprising:

a storing step of storing a RSS information unit in an information storage;

a deleting step of deleting RSS information units stored in the information storage in ascending order of levels corresponding to the RSS information units, thereby securing a free area for a newly generated RSS information unit; and a generating step of generating, in accordance with occurrence of an event, a new RSS information unit indicating the occurrence of the event and storing the RSS information unit in the information storage together with a level corresponding to the event, wherein the generating step includes a controlling step of controlling to, if the event that has occurred is a failure event, associate a unique identifier corresponding to a type of the failure with the generated RSS information unit and assign a level higher than those of events other than the failure event to the generated RSS information unit, and if the event that has occurred is a recovery event from a failure, search the stored RSS information units for an RSS information unit with which an identifier corresponding to the solved failure is associated and lower a level given to the RSS information unit.

7. The medium according to claim 6, wherein the generating step gives date and time information of generation to the RSS information unit and stores the RSS information unit, and wherein if a plurality of RSS information units having a lowest level exist as deletion targets, the deleting step deletes an RSS information unit with oldest date and time information given from the stored RSS information units.

8. The medium according to claim 6, wherein said method further comprises a second determining step of determining, when the level of a stored RSS information unit is changed, whether a failure has occurred in the device, and no RSS information unit corresponding to the failure has been stored, and wherein if the second determining step determines that a failure has occurred in the device, and no RSS information unit corresponding to the failure has been stored, the generating step generates an RSS information unit which should have been generated at a time of occurrence of an event of the failure occurrence.

\* \* \* \* \*